Patented Sept. 2, 1941

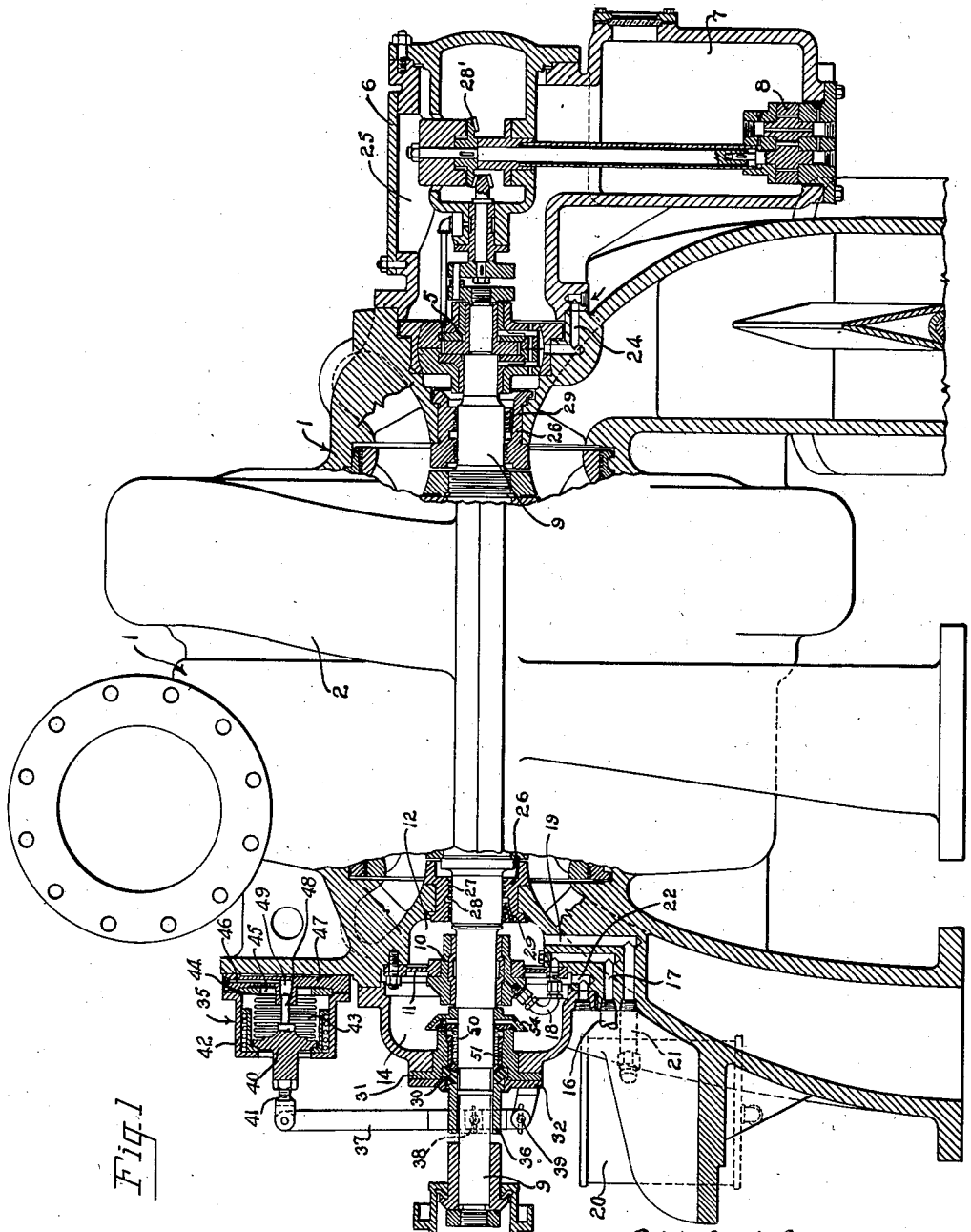

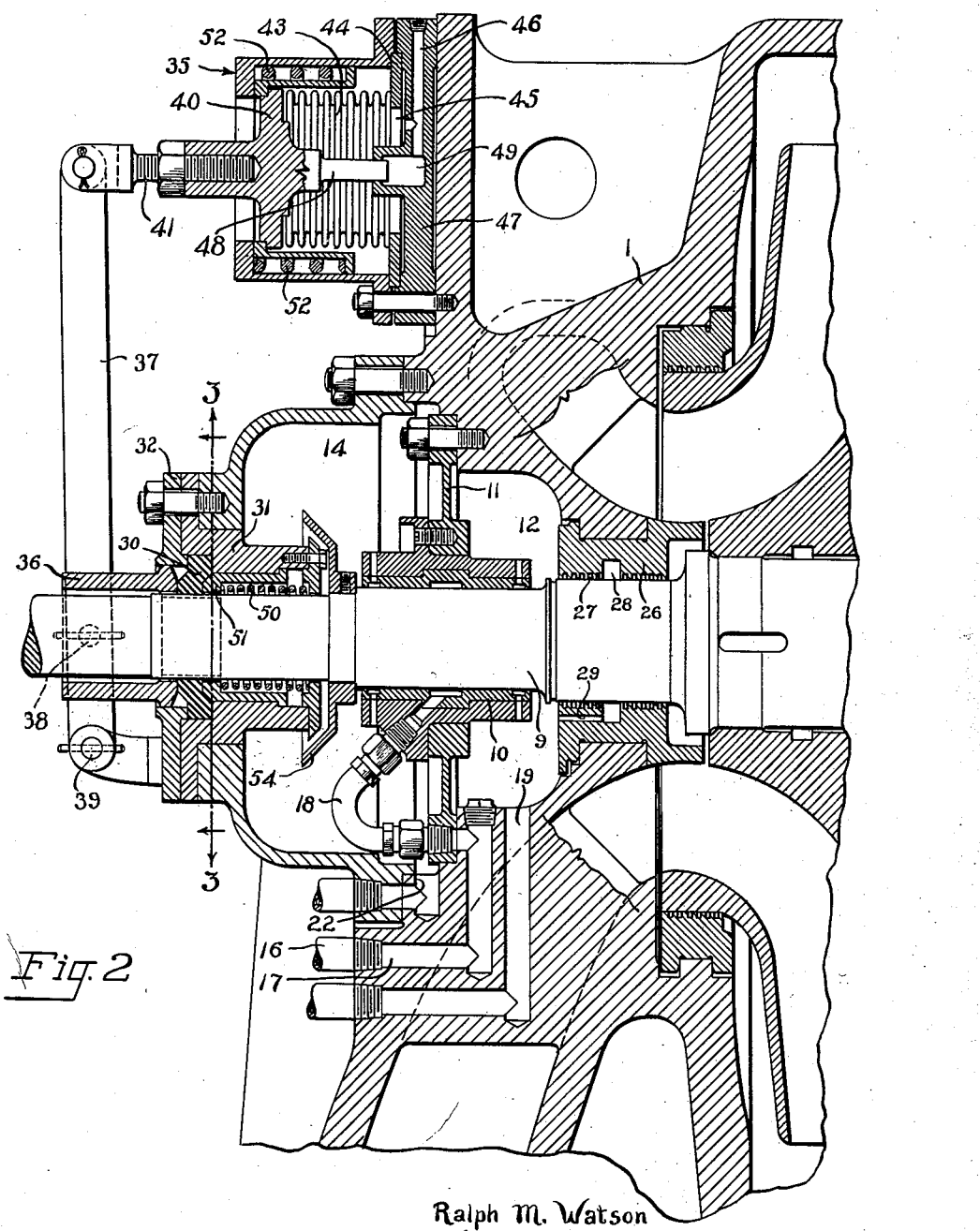

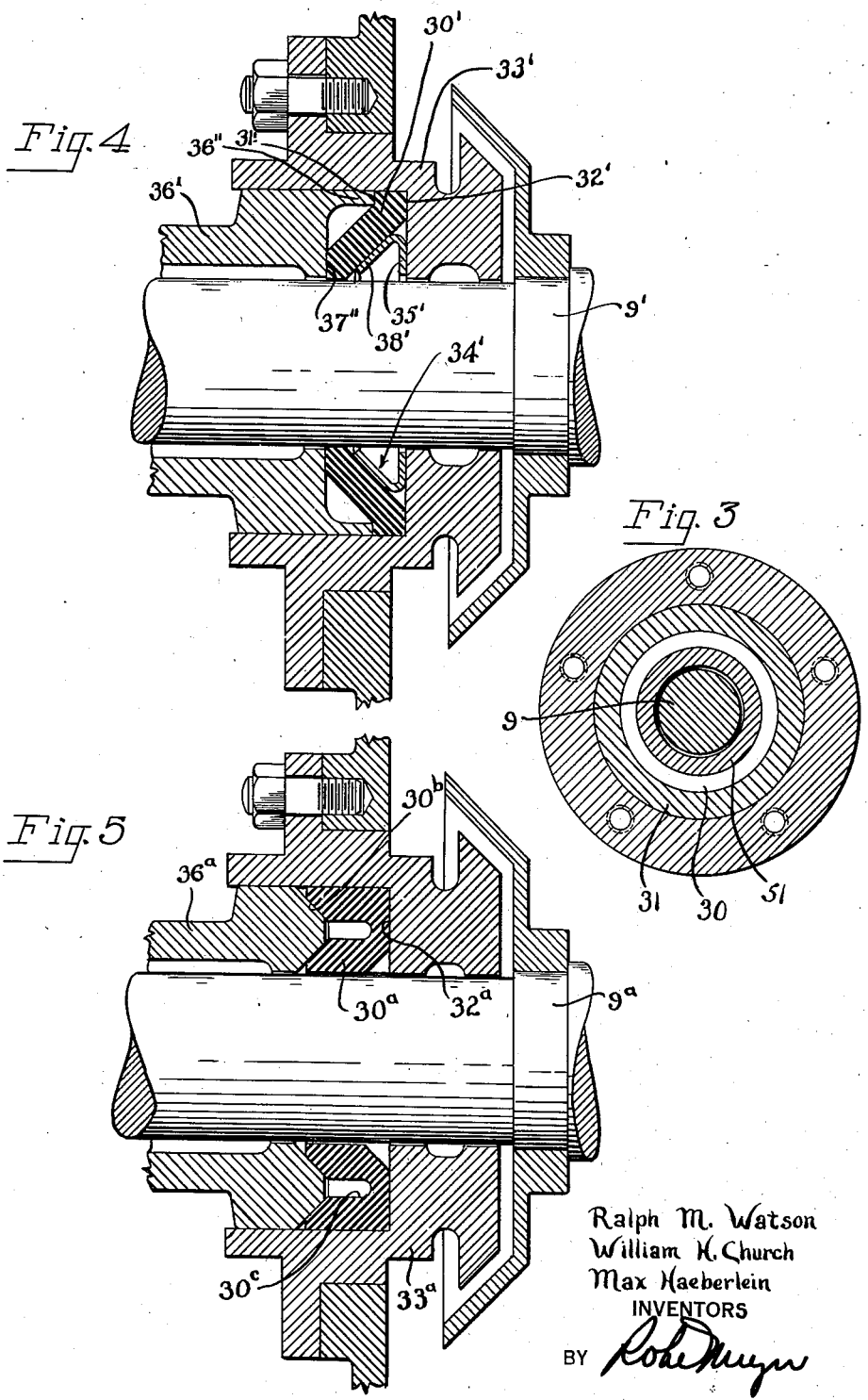

2,254,862

UNITED STATES PATENT OFFICE 2,254,862

SHAFT SEAL FOR CENTRIFUGAL MACHINES

Ralph M. Watson, Bloomfield, William H. Church, Jersey City, and Max Haeberlein, Maplewood, N. J., assignors to Worthington Pump and Machinery Corporation, Harrison, N. J., a corporation of Delaware Application April 16, 1940, Serial No. 329,890

7 Claims. (Cl. 308—36.3)

This invention relates to centrifugal compressors such as are employed in refrigerating systems to handle volatile refrigerants of low vapor pressure and high density such as, for example, trichlorofluoromethane, methylene chloride, or the like, and more particularly to a method and structure for sealing and lubricating the compressor of the type shown in the copending application, Serial Number 329,498, filed April 13, 1940.

Primarily, the object of the present invention is to provide a simple and efficient oiling system and mechanism for a high speed centrifugal compressor or pump which will serve to lubricate the bearings and supply a liquid seal for preventing leakage of air into or leakage of vapor from the casing of the machine.

Another object of the invention is to provide in combination with the liquid seal, which is effective when the compressor is operating, a seal for effectively sealing the shaft opening against leakage when the compressor is not operating and to provide pressure operated means operated by pressure of lubricating and sealing oil to control the sealing operation of the seal effective when the compressor is not operating.

With these and other objects in view, as may appear from the accompanying specification, the invention consists of various features of construction and combination of parts, which will be first described in connection with the accompanying drawings, showing a shaft seal for centrifugal machines of the preferred form embodying the invention, and the features forming the invention will be specifically pointed out in the claims.

In the drawings:

Figure 1 is a view partly in longitudinal section and partly in elevation of a centrifugal compressor embodying the present invention.

Figure 2 is an enlarged longitudinal section of the sealed end of the compressor.

Figure 3 is a cross-section on the line 3—3 of Figure 2.

Figure 4 is a detail longitudinal section of a modified form of the seal which is effective when the compressor is not running.

Figure 5 is a detail longitudinal section through a further modified form of the seal which is effective when the compressor is not operating.

Figure 6:
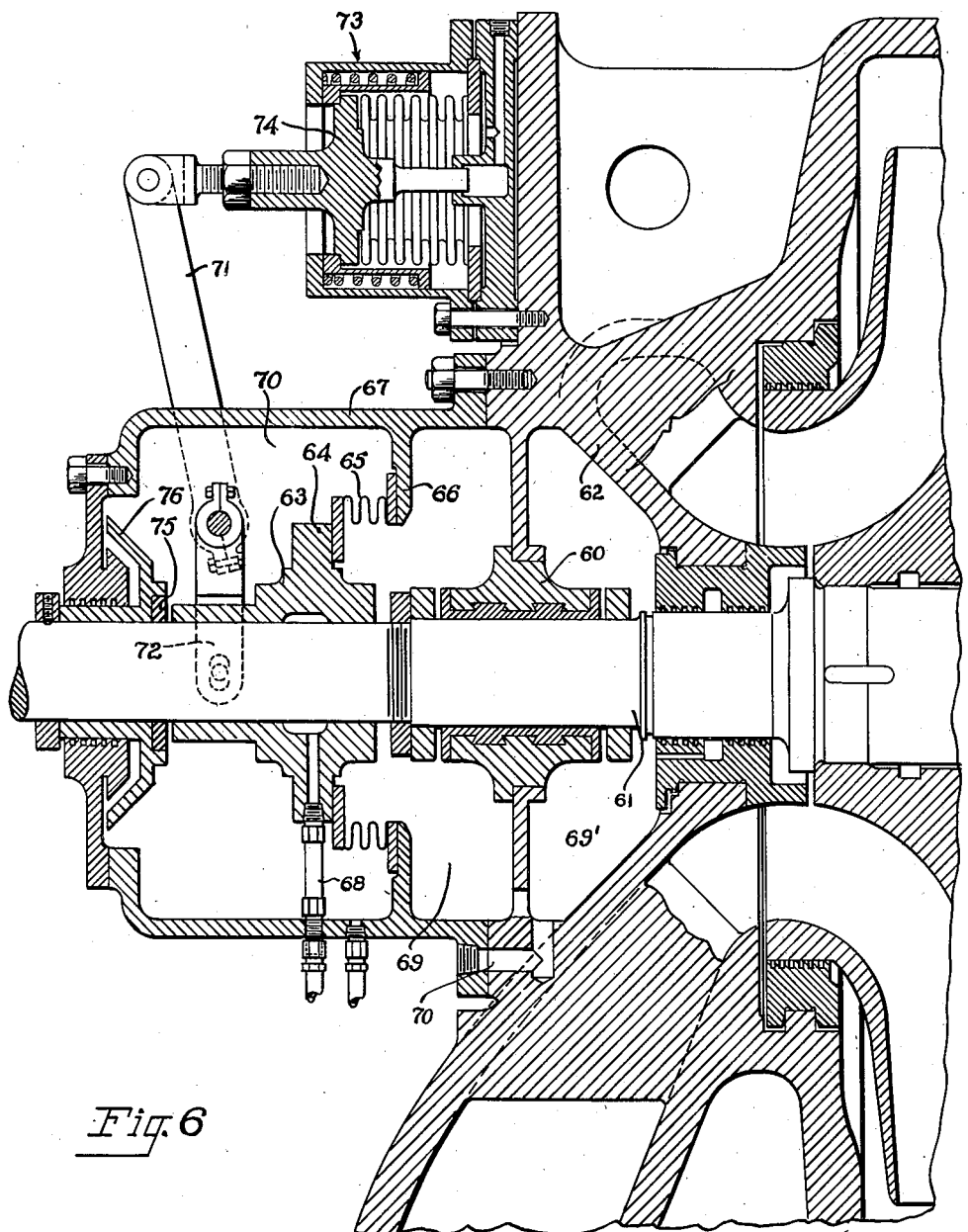
Figure 6 is a longitudinal section through a modified form of the seal structure.

Referring more particularly to the drawings, the improved sealing mechanism of the present invention is illustrated in connection with a particular type of centrifugal compressor adapted for handling volatile refrigerant. But it is to be understood that the invention may be employed with any type or construction of centrifugal compressor or like machine without departing from the spirit of the present invention.

The compressor 1 illustrated in the drawings is a multi-stage volute type of compressor with cross-over passages 2 connecting the discharges of the various stages with the suction of the next succeeding stage, so that the ends of the casing where the shaft protrudes will be subjected to intermediate pressures of the compressor and neither of them will be subjected to the maximum pressure developed by the compressor.

The shaft, at the initial suction end of the compressor 1, is supported in an approved type of bearing 5, which is enclosed in an extension 6 formed on the casing. The extension 6 forms a chamber about the bearing 5 and it opens into or has communication with an oil reservoir 7 in which is located any suitable type of oil pump indicated at 8, which circulates the lubricating oil under the necessary and desired pressure.

The shaft 9 of the compressor at the end of the casing 1 opposite to the initial suction end, is supported by a bearing 10. The bearing 10 is of a novel, self-aligning type, disclosed and claimed in co-pending application of Max Haeberlein, filed March 16, 1940, Serial Number 324,251. That is, the cylindrical bearing 10 is supported from the compressor casing 1 by a thin, flexible disc 11, which compensates for misalignment of the axis of the shaft, which may be due to hydraulic forces such as radial thrust, to "whipping" of the shaft, or to machine misalignment. The bearing 10 has one end opening into a chamber 12 formed by the compressor casing and the supporting disc 11, while the other end opens into the outer chamber 14. The bearing 10 is a close fitting bearing and is sealed against leakage of vapor from the interior of the casing and from leakage of air through the bearing into the interior of the casing by the lubricating oil which is circulated through the lubricating system of the compressor from the reservoir 7 by the pump 8 through the cooler and the pipe 16 into the passage 17 and connecting tube 18.

Part of the oil which is delivered to the interior of the bearing 10 flows outwardly into the chamber 12 from which it returns through the passage 19 and suitable piping 21 to the collecting chamber 20, from which it returns to the reservoir 7. The chamber 12 is subjected to the pressure within the compressor casing 1, which is the suction pressure of the final stage of the compressor and may be slightly greater or slightly less than atmosphere, depending upon the conditions of operation of the compressor. The remaining oil which is fed to the bearing 10 flows outwardly into the chamber 14 and from the chamber 14 through the passage 22 and suitable piping to a second collection chamber similar to the collection chamber 20, and from thence through suitable piping (not shown) to the reservoir 7 for recirculation through the system. The chamber 14 is subjected to atmospheric pressure.

Oil is circulated through the bearing 5 through suitable piping and the passage 24 and it flows outwardly through this bearing and is returned to the reservoir 7 through the chamber 25 formed in the casing extension 6. The chamber 25 is subjected to the initial suction pressure of the compressor, which is less than atmosphere.

Suitable oil collection and oil dam forming collars 26 are mounted about the shaft 9 between the respective bearings 5 and 10. These collars 26 have a plurality of annular, longitudinally spaced serrations 27 in their inner surfaces and each of them is provided with an intermediate annular oil collection chamber 28 which drains back through a suitable passage 29 either into the chamber 25 or the chamber 12 so that any oil which passes into the chambers 28 is returned to the lubricating system of the compressor.

The pump 8 is driven from the shaft 9 through any suitable type of driving mechanism, such as indicated at 28' and thus, at all times during operation of the compressor, oil is delivered to the bearings 5 and 10 at a pressure slightly in excess of the pressure in the chamber 12, serving to lubricate the bearings and also, since the bearings are close fitting bearings, to form effective oil seals about the shaft 9 to prevent leakage of air from atmosphere into the compressor and prevent leakage of refrigerant from the compressor. However, when the compressor is not running this oil seal is not provided, and as a consequence means are provided at the end of the compressor through which the driving end of the shaft 9 extends to provide an effective seal for the shaft opening when the compressor is not running. Such a seal is not necessary at the end of the shaft adjacent to the initial inlet of the compressor, since this end of the compressor is enclosed wholly within the casing extension 6.

The mechanism for effectively sealing the shaft opening when the compressor is not operating is clearly illustrated in Figure 2 of the drawings and includes a soft, flexible collar 30 of any suitable material, such as "Neoprene" or the like. The soft flexible packing collar 30 is mounted about the shaft 9 outwardly of the bearing 10, and its outer peripheral portion is securely anchored in place by clamping action of the casing section 31 and the plate 32. When the shaft 9 is rotating, that is, when the compressor is operating, the packing collar 30 is out of engagement with the shaft 9, or loosely and freely engages the shaft, but when the shaft ceases rotation and the supply of sealing lubricating oil to bearing 10 is cut off, the packing collar 30 is forced into tight, squeezing engagement with the shaft to form an effective vapor seal about the shaft. The forcing of the collar 30 into sealing engagement with the shaft 9 is controlled by the mechanism generically indicated at 35 and clearly disclosed in Figure 2. This mechanism includes a sleeve 36 which is slidably mounted about the shaft 9 and the inner end of which engages the outer surface of the collar 30 near its inner perimeter. A lever 37 is connected to the sleeve 36 by suitable pins 38. The lower end of the lever 37 is pivotally supported, as shown at 39, while the upper end of the lever is adjustably and pivotally connected to a piston 40 by a coupling member 41. The piston 40 is enclosed within a cylinder 42 and has a "Sylphon" bellows 43 connected thereto. The opposite end of the bellows 43 from that which is connected to the piston 40 is connected to a stationary plate 44, the center of which is open, as shown at 45. Lubricating oil is delivered through the passage 46 in the carrying head 47 of the cylinder 42 through the opening 45 into the bellows 43, when the compressor is running. It may be found desirable to provide an auxiliary pump or pressure creating means for initially creating an oil pressure to release the flexible sealing ring before the pressure of oil is built up by the pump 8, also to establish pressure of oil through the bearing to prevent leakage therethrough. The pressure of the lubricating oil expands the bellows and moves the piston 40 outwardly, moving the sleeve 36 outwardly to relieve the collar 30 of pressure and permit it to assume its non-sealing position relative to the shaft 9. The piston 40 has a guiding stem 48 thereon, one end of which extends into a chamber 49, which is also open to the passage 46 so that the lubricating oil acts upon the end of the guiding rod or plunger 48 as well as on the bellows 43 and piston 40.

When the sleeve 36 is moved outwardly under the action of the lubricating oil, as above specified, the sealing collar 30 is urged out of sealing engagement with the shaft 9 by a spring 50, which acts on a follower sleeve 51. The sleeve 51 engages the inner side of the sealing collar 30, and the accompanying spring 50 is compressed when pressure is asserted on the collar 30 by the sleeve 36. When shaft 9 stops rotating and the compressor stops, delivery of lubricating oil under pressure into bellows 43 will cease and at this time the spring 52 will act to compress bellows 43 and move piston 40 to the right. Movement of the piston 40 to the right under action of spring 52 will move lever 37 upon its pivot 39 and move sleeve 36 inwardly against sealing collar 30, forcing the collar against the action of the spring 50 and into tight sealing engagement with the shaft 9, providing a vapor seal about the shaft where it extends out of the casing of the compressor.

A slinger 54 is mounted on the shaft 9 inwardly of the packing collar 30 and is substantially dish-shaped. This slinger, rotating with the shaft 9, serves to prevent oil passing from the chamber 14 to the packing collar 30, for the purpose of protecting the collar against action of the oil.

Figure 4 of the drawings shows a modified construction of the soft flexible sealing collar and its companion construction. In this modified construction the collar 30' is substantially frustoconical in shape, having an annular outer peripheral portion 31', the inner flat side of which engages a shoulder 32' formed on the casing extension 33'. The main body of the collar 30' inclines inwardly towards the axis of the shaft and outwardly away from the interior of the compressor and its inner periphery is urged out of sealing engagement with the shaft 9' by a metal spring 34', which is substantially V-shaped in cross-section, providing a radially extending side 35' which engages the shoulder 32', and an inclined portion 38' which engages the inner side of the collar 30'. The collar 30' is forced into sealing engagement with the shaft 9' by a sleeve 36', which may be operated by a similar mechanism to the mechanism 35 shown in Figure 2 of the drawings. The sleeve 36' has an annular, longitudinally extending flange 36" on its inner end which engages the outer flat side of the peripheral portion 31' of the collar 30', while the inner end of the sleeve 36' engages the flat crown or outer-most portion 37" of the collar 30' for applying pressure to the collar and forcing it into firm sealing engagement with the shaft 9' when the compressor is not operating. When the compressor is operating and the collar 30' is relieved of pressure of the sleeve 36', the spring 34' forces the collar out of sealing engagement with the shaft 9'.

A further modified construction of the sealing collar is shown in Figure 5 of the drawings, and in this construction the collar is constructed and depends upon its own resilient or elastic properties to move it out of sealing engagement with the shaft, in lieu of utilizing a spring such as either the spring 50 or the spring 34'.

The collar 30ª has a wedge-shaped recess 30ᵇ extending thereinto from its outer side, which terminates in a radial, inwardly extending recess 30ᶜ. The collar fits snugly against a shoulder 32ª formed on the casing extension 33ª. The sliding sleeve 36ª, which corresponds to the sleeves 36 and 36' in the structures described heretofore, has its inner end tapered to form a wedge-shaped surface or inclined surfaces which coincide with and snugly fit the surfaces of the wedge-shaped recess 30ᵇ so that when the sleeve 36ª is forced inwardly under action of a mechanism similar to the mechanism 35, it will spread the soft packing collar 30ª and force it into sealing engagement with the shaft 9ª. When the sleeve 36ª is moved outwardly and the collar is relieved from pressure of said sleeve, the inherent resiliency of the collar 30ª will cause it to move out of sealing engagement with the shaft 9ª.

Figure 6 of the drawings shows a modified form of the entire sealing structure, which however has several features in common with the preferred form of the invention shown in Figures 1 and 2 of the drawings.

In the modified form shown in Figure 6 of the drawings, the bearing 60 for the shaft 61 is carried by the casing 62 of the compressor. The shaft 61 has a non-rotating sleeve 63 slideably mounted thereon outwardly of the bearing 60. The sleeve 63 has an annular flange 64 formed thereon which is connected by a bellows 65 to the inwardly extending annular rib 66 formed on the casing extension 67. Oil is fed, under pressure, to the interior of the sleeve 63 through a suitable oil inlet 68, and flows out of the inner end of the sleeve into the connected chambers 69 and 69' and thus to and about the bearing 60 for lubricating the bearing. From the chambers 69 and 69' the oil is returned to any suitable point by a drain 70. The oil which flows out of the non-rotating sleeve 63 away from the chambers 69 and 69' flows into the outer chamber 70, which is under atmospheric pressure, while the chambers 69 and 69' are under pressure equal to the pressure in the casing of the compressor adjacent to the chambers.

The sleeve 63 is slidable on the shaft 61 and is moved along the shaft through the medium of a lever 71, links 72 and a mechanism 73, which latter is similar in construction to and operates in the same manner as the mechanism 35 shown in Figures 1 and 2 of the drawings. Thus the lever 71 is moved under action of the piston 74 to move the sleeve 63 into or out of engagement with the soft, flexible packing collar 75 in the same manner in which the sleeve 36 is operated. The sealing collar 75, which may be of "Neoprene" or any other suitable material, is mounted about the shaft 61 and is shown in Figure 6 of the drawings as being carried by a dish-shaped oil guard 76. The sleeve 63 is moved out of engagement with the sealing collar 75 during rotation of the shaft 61, allowing the collar 75, either by its own inherent resiliency or by any other suitable means such as disclosed in Figures 2, 4 or 5 of the drawings, to move out of sealing engagement with the shaft 61. However, when the compressor or machine is stopped and the supply of oil under pressure to the mechanism 73 is consequently cut off, the sleeve 63 will be moved into engagement with the collar 75, forcing the collar into sealing engagement with the shaft 61.

It is of course understood that the collars 30, 30', 30ª and 75, being of a soft, resilient packing material, are compressed in one direction by the action of the sliding sleeves, and expanded in another direction, or in other words their shape distorted, by the force applied by the sleeves to force them into tight, vapor-sealing engagement with the shafts.

It will be understood that the invention is not to be limited to the specific construction or arrangement of parts shown, but that they may be widely modified within the invention defined by the claims.

What is claimed is:

1. In a shaft seal for centrifugal machines embodying a casing having a shaft opening therein and a shaft extending through said opening, a soft flexible sealing collar for forming a seal for said opening, said collar being in pressure relieved non-sealing condition during rotation of the shaft, a non-rotatable sleeve carried by said shaft and out of engagement with said collar during rotation of the shaft, and means for forcing said sleeve into engagement with the collar to force the collar into sealing position and condition when rotation of the shaft is stopped.

2. In a shaft seal for centrifugal machines embodying a casing having a shaft opening therein and a shaft extending through said opening, a soft flexible sealing collar for forming a seal for said opening, said collar being in pressure relieved non-sealing condition during rotation of the shaft, a slidable non-rotatable sleeve out of engagement with said sealing collar during rotation of the shaft, and means controlled by operation of the machine for forcing said sleeve into engagement with the sealing collar to force it into sealing position and condition when rotation of the shaft is stopped.

3. In a shaft seal for centrifugal machines embodying a casing having a shaft opening therein and a shaft extending through said opening, a lubricating system for said machine comprising means to force lubricant under pressure to the parts of the machine to be lubricated.

a soft flexible sealing collar for forming a seal for said opening, said collar being in pressure relieved, non-sealing condition during rotation of the shaft, a slidable non-rotatable sleeve out of engagement with said collar during rotation of the shaft, and means controlled by the pressure of lubricant in said lubricating system for forcing said sleeve into engagement with said sealing collar to force it into sealing position and condition when rotation of said shaft is stopped.

4. In a shaft seal for centrifugal machines embodying a casing having a shaft opening therein and a shaft extending through said opening, a lubricating system for said compressor comprising means to force lubricant under pressure to the parts of the machine to be lubricated, a soft flexible sealing collar for forming a seal for said opening, said collar being in pressure relieved non-sealing condition during rotation of the shaft, a slidable non-rotatable sleeve out of engagement with said collar during rotation of the shaft, and means controlled by the pressure of lubricant in said lubricating system for forcing said sleeve into engagement with said sealing collar to force it into sealing position and condition when rotation of said shaft is stopped, said lubricating system embodying a passage opening into the interior of said sleeve to deliver lubricant into the sleeve to form a vapor seal about the shaft when the machine is running.

5. In a shaft seal for centrifugal machines embodying a casing having a shaft opening therein and a shaft extending through said opening, a soft flexible sealing collar for forming a seal for said opening, said collar being in pressure relieved non-sealing condition during rotation of the shaft, means for applying pressure to said collar and forcing it into sealing condition when said shaft is stopped, and a spring for forcing said sealing collar out of sealing condition upon the release of pressure against the collar by said pressure applying means.

6. In a shaft seal for centrifugal machines embodying a casing having a shaft opening therein and a shaft extending through said opening, a lubricating system for said machine comprising means to force lubricant under pressure to the parts of the machine to be lubricated, a soft flexible sealing collar for forming a seal for said opening, said collar being in pressure relieved, non-sealing condition during rotation of the shaft, a slidable non-rotatable sleeve out of engagement with said collar during rotation of the shaft, means controlled by the pressure of lubricant in said lubricating system for forcing said sleeve into engagement with said sealing collar to force it into sealing position and condition when rotation of said shaft is stopped, and a spring for forcing said sealing collar out of sealing condition upon release of pressure against the collar by said sleeve.

7. In a shaft seal for centrifugal machines embodying a casing having a shaft opening therein and a shaft extending through said opening, means for sealing said opening about said shaft including a tight fitting bearing for said shaft, means for delivering lubricant to the interior of said bearing, a chamber in the casing exteriorly of said bearing into which lubricant flows from the bearing, a soft flexible sealing collar about said shaft exteriorly of said chamber, means normally urging said collar out of sealing engagement with said shaft, means for forcing said collar into sealing engagement with said shaft, said forcing means acted upon by pressure of the circulated lubricant for operating the collar urging means to relieve the collar of forcing action thereon during operation of the machine.

RALPH M. WATSON.
WILLIAM H. CHURCH.
MAX HAEBERLEIN.